United States Patent [19]
Davis

[11] 3,911,706
[45] Oct. 14, 1975

[54] METHOD AND APPARATUS FOR FORMING METAL

[76] Inventor: Murray W. Davis, 20501 Woodmont, Harper Woods, Mich. 48225

[22] Filed: Aug. 2, 1974

[21] Appl. No.: 494,050

Related U.S. Application Data

[62] Division of Ser. No. 349,227, April 9, 1973, Pat. No. 3,852,627.

[52] U.S. Cl. .................... 72/56; 29/421; 72/370; 72/430; 164/49; 164/146; 164/147; 417/50
[51] Int. Cl.² ........................................ B21D 26/14
[58] Field of Search ....... 72/56, 430, 287, 367, 370; 310/12–14, 45, 193, 216; 164/49, 146, 147, 250, 251; 415/10; 417/50, DIG. 1; 29/421

[56] References Cited
UNITED STATES PATENTS

| | | | |
|---|---|---|---|
| 2,393,243 | 1/1946 | Franz | 72/56 UX |
| 3,203,211 | 8/1965 | Mallinckroot | 72/56 |
| 3,212,311 | 10/1965 | Inoue | 72/56 X |
| 3,400,180 | 9/1968 | Buttner et al. | 264/24 |
| 3,735,799 | 5/1973 | Karlson | 164/147 |
| 3,746,074 | 7/1973 | Baumann | 164/49 |

Primary Examiner—C. W. Lanham
Assistant Examiner—Joseph A. Walkowski
Attorney, Agent, or Firm—Cullen, Settle, Sloman & Cantor

[57] ABSTRACT

A linear induction motor having an elongated secondary or rotor member, and a cylindrical hollow primary or stator member having teeth formed as washers with energizable coils between the washers. The stator and coils concentrically surround the rotor member. The stator teeth have an inner washer or facing of a material having higher magnetic permeability and saturation properties than the stator to thereby provide composite stator teeth which do not magnetically saturate when high rotor forces are required for small diameter rotors. The motor has a particular utility in removing a workpiece from a die or other forming means.

10 Claims, 8 Drawing Figures

METHOD AND APPARATUS FOR FORMING METAL

This is a division of application Ser. No. 349,227, filed April 9, 1973. now Pat. No. 3,852,627.

BACKGROUND OF THE INVENTION

The invention herein relates to a linear induction motor which is an improvement over that disclosed in my U.S. Pat. No. 3,602,745, issued Aug. 31, 1971.

Many applications for tubular or concentric linear induction motors require a high rotor force on a rotor of a small diameter or cross-sectional area. These rotors may consist of small solid wires or rods of electrically conductive material or hollow tubes of electrically conductive material which may also contain rotor core material. Whether they be hollow or solid, the basic characteristic is a small cross-sectional area.

Problems arise in the design of linear induction machines which require large electromagnetic forces on the rotors having small cross-sectional areas. This necessitates the use of a very long stator member which has its own resultant design problems. For example, a prior art linear induction motor such as that disclosed in my U.S. Pat. No. 3,602,745, if utilized with a rotor of a small cross-sectional area, would have to be very long to provide a high rotor force, since the force generated depends largely on the total surface area of the rotor.

Another problem is magnetic saturation of the iron in the stator and in the rotor core if the rotor core should contain iron. Magnetic saturation may result when high magnetic flux densities are necessary to produce the required force necessary to pull the rotor through the stator.

Thus, the invention herein relates to an improved linear induction motor which can create high rotor forces on small diameter rotors, and with a minimum of weight, size and cost of the stator.

SUMMARY OF THE INVENTION

The invention herein contemplates an improved linear induction motor having an elongated secondary or rotor member and cylindrical hollow primary or stator member having teeth formed as washers with slots therebetween to receive energizable coils. The stator and coils concentrically surround the rotor member. The stator teeth have a facing or an insert of a material having higher magnetic permeability and saturation properties than the stator member to thereby provide a composite stator tooth which does not magnetically saturate when rotors having small cross-sectional areas are utilized, while still providing high rotor forces.

The present invention has uses whether the rotor is hollow in cross-section, such as a tube, or solid such as a wire or rod. For example, the use of a composite stator tooth provides the force necessary to extrude a wire, rod or tube from an extrusion die. Furthermore, the force generated by the improved linear induction motor may be utilized to form or draw a hollow tube about a mandrel.

Various forms of facings and inserts on the stator teeth are disclosed and the particular shape of the facing may be designed based upon the maximum magnetic flux density necessary in a particular application.

Means are also provided for air cooling the linear induction motor such as by providing apertures in the stator members and a manifold connected thereto through which air may be circulated through the motor.

DESCRIPTION OF THE DRAWINGS

The improved linear induction motor, together with its various advantages, will become apparent upon reading the following detailed description taken in conjunction with the following drawings.

In the drawings, wherein like reference numerals identify corresponding parts.

DETAILED DESCRIPTION

Figure 1:
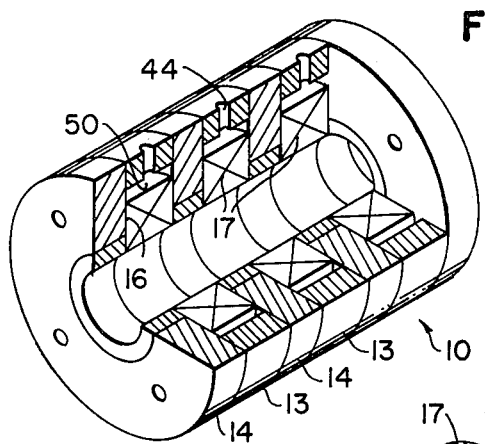
FIG. 1 is a fragmentary perspective illustration of a concentric linear induction motor having a composite stator tooth.

With reference to the drawings, the linear induction motor 10 includes a hollow, cylindrical stator 12 which may be a composite assembly of alternating stator rings 13 and stator washers or teeth 14. Upon assembly of the stator, there is an annular slot or opening 16 between adjacent teeth to receive electrically energizable coils 17 which may be wound on spools 18.

Figure 2:
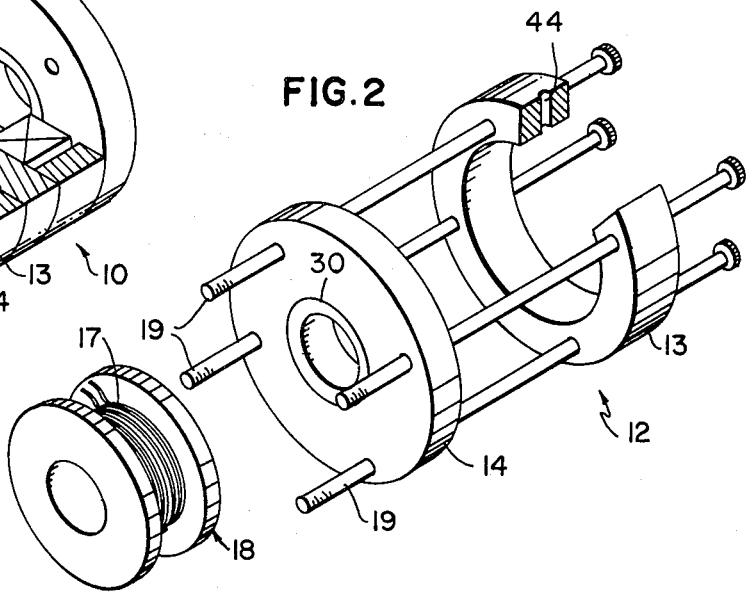
FIG. 2 is a partial assembly drawing of the motor of FIG. 1.

The coils 17 and stator washers and rings together make up a rigid stator 12 which may be fixed against movement by securing the same within a suitable housing or which is rigid in and of itself if bolts 19 are passed through suitable apertures in the stator washers and stator rings as illustrated in FIG. 2.

Figure 3:
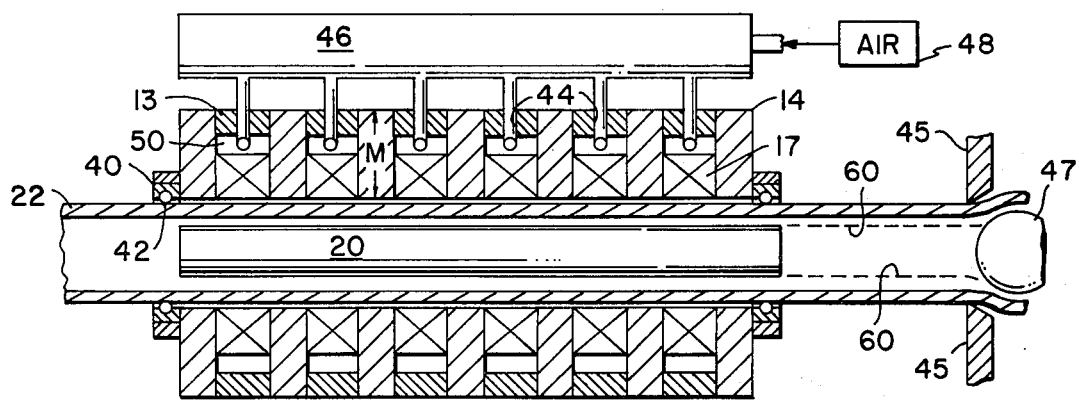
FIG. 3 is a cross-sectional view of a linear induction motor as described herein.

Arranged concentrically within the stator and its coils are rotor means as illustrated in FIG. 3 which may include either a rotor core 20, a rotor tube 22 or both the rotor core and the tube as set forth in my U.S. Pat. No. 3,602,745. The rotor means has been omitted from FIGS. 1 and 2 for greater clarity.

The particular structure of the rotor means varies depending upon the application or use of the motor. Thus, the motor of the present invention may be utilized with or without a rotor core 20 to extrude a thin, hollow tube 22 from an extrusion die.

Figure 4:
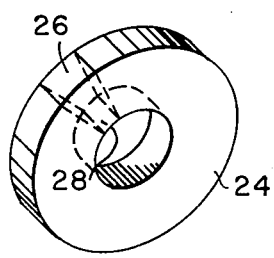
FIG. 4 is a perspective illustration of an individual stator tooth of the motor of FIGS. 1–3 with the facing removed.

FIG. 4 illustrates, in perspective, an individual stator tooth or washer 24. The problem of magnetic saturation may be explained by considering a sector 26 on the outer periphery of the stator tooth 24 which receives a particular amount of flux. The flux moves radially inward, within a tooth, from the outer area 26 down through the tooth to the inner area 28 on the face of the tooth.

Since the flux is constant and since the surface area at the periphery or outer portion of the tooth 26 is greater than at the inner portion 28, it is immediately apparent that the flux density or flux per unit area increases toward the inner portion of the stator tooth.

However, the size of the inner tooth face as at 28 is related to the circumference and thus to the cross-sectional area of the rotor means. Thus, as the rotor has an increasingly smaller diameter, the inner flux ring of the individual stator tooth gets smaller, thus increasing flux density and tending to push the stator higher into saturation.

To overcome this problem, the invention contemplates the use of a composite stator member having, at its inner regions, a material having a magnetic permeability and saturation level higher than those of iron.

For example, vanadium permendur is an alloy of iron and cobalt having approximately 49 percent of each with about 2 percent vanadium. This material has a very high magnetic saturation level, it is exceptionally highly permeable, and provides for low core losses. Unfortunately, this material is prohibitively expensive and cannot be utilized economically for the stator of a linear induction motor.

I have discovered that it is possible to utilize this type of material only as a facing on the inner area of the stator teeth. The thickness and shape of the facing may be mathematically determined, based upon the flux densities necessary in a particular application.

Figure 5:
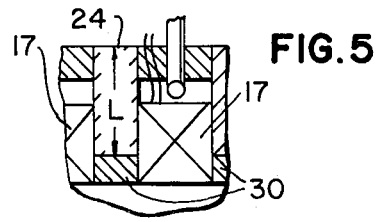
FIG. 5 is a partial enlargement of the motor of FIGS. 1–3 illustrating a composite stator tooth.
Figure 6:
FIG. 6 is a perspective illustration of the facing or insert which forms a part of the composite stator tooth of FIG. 5.

For example, with reference to FIGS. 5 and 6, there is illustrated the use of a facing or insert of vanadium permendur in the form of a washer. This washer has a thickness or axial dimension 31 substantially the same as the axial thickness of an individual tooth 24.

In the forming of the composite stator tooth structure, it is noted that the portion of the stator tooth which will be of iron is shorter, as at L in FIG. 5 than the corresponding length M of a tooth 14 illustrated in FIG. 3. The precise length of the facing may be calculated based upon the flux densities to be utilized in order to prevent the iron from becoming magnetically saturated.

Figure 7:
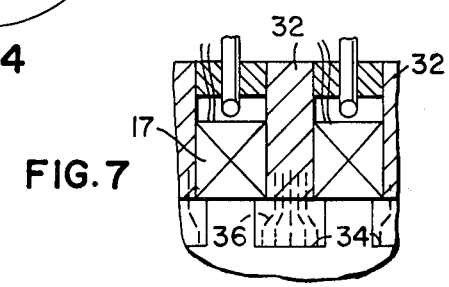
FIG. 7 is a partial enlargement of the motor of FIGS. 1–3 showing a facing of a second construction.

With reference to FIG. 7, there is illustrated a non-uniform thickness composite stator tooth which may be employed to increase the total flux through the stator teeth. The stator tooth of FIG. 7 includes a composite tooth having electrical grade iron as at 32 and a facing of a material of a higher magnetic permeability such as vanadium permendur as at 34. It is noted that the facing material 34 is axially of a greater dimension than the axial dimension of an individual iron stator tooth 32.

FIG. 7 illustrates flux lines 36 showing the divergence of the magnetic flux through the facing 34. Since vanadium permendur is expensive and, since portions of the facing 34 do not receive the diverging flux lines 36, these portions may be removed.

Figure 8:
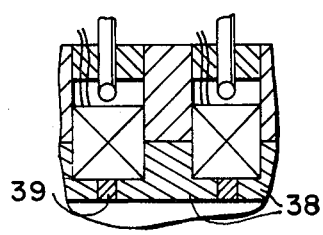
FIG. 8 is a partial enlargement of the motor illustrating yet another structure for the facing on a stator tooth.

Specifically, FIG. 8 illustrates another embodiment of the shape of the facing which takes the form of an inverted T, as at 38. This provides an optimum shape for the vanadium permendur facing. An encapsulating material 39 may be used between adjacent facings for insulation and rigidity. It must be appreciated that all the shapes of the facings disclosed will permit highly increased rotor forces without magnetic saturation for a given length stator as compared to the linear induction motors of the prior art.

In the application of the present invention, FIG. 3 illustrates the stator having collars 40 through which the rotor means may pass. Bearings 42 may be utilized as set forth in my prior U.S. Pat. No. 3,602,745 if there is sufficient room for them.

To overcome the problem of heat a plurality of slots 44 are provided in the stator rings 13 and a manifold 46 is connected from a source of air 48 to these slots. Above each coil 17 is a rectangular, annular channel 50 between the sides of the spool 18. Each is in communication with slot 44 to define fluid paths through the motor. Air may then be circulated through the slots and channels and thus cool the motor during operation.

In addition to utilizing the motor 10 to extrude hollow tubes 22, or solid wires and rods through a die or other forming means 45, the motor of the present invention may be used to draw a tube 22 around a mandrel or bulb 47. The rotor core 20 itself could serve as the mandrel as indicated by the dotted extension 60 of the core 20 into the forming means. Also, liquid or molten metal may be moved through a stationary hollow tube. Multiple motors, in tandem, may of course be utilized in any of these applications.

The benefit of using the rotor core 20 is that it concentrates the flux density. However, it must be appreciated that since the diameter of the rotor core is smaller than the diameter of the teeth facing the core, the flux density will increase tending to push the core closer towards saturation. Therefore, if a core is used, it must be of a material having a higher magnetic permeability than the iron found in the stator teeth. Vanadium permendur may be utilized for the rotor core.

If the rotor core is solid, it may be manufactured of vanadium permendur or, it may be a tube of iron having a solid central core of vanadium permendur inserted therein. If a hollow rotor core is used, it may be a tube of vanadium permendur or a tube of iron having an inner facing of vanadium permendur just as the stator has an inner facing 30 of vanadium permendur.

The foregoing is a description of the present invention and should not be taken in a restrictive sense but only as describing the underlying theory of operation. The inventive concepts may be further developed within the scope of the following claims.

I claim:

1. A method for continuously removing electrically conductive metal from a forming means, comprising the steps of:

providing a concentric, converging flux, linear induction motor having a hollow cylindrical stator member made of a material of high magnetic permeability, said stator member including a plurality of annular teeth having teeth faces, said teeth faces having a discrete facing of material of higher magnetic permeability than the stator member material, said teeth being longitudinally spaced apart to define annular slots therebetween with energizable coils in said slots;

surrounding said metal with said stator and coils; and longitudinally removing said metal from said forming means by energizing said coils.

2. The method as defined in claim 1, wherein said metal is in the liquid state and said step of removing includes flowing said metal interiorly of a hollow tube.

3. The method as defined in claim 1, wherein said step of removing includes:

extruding said metal with a solid cross-section through an extrusion orifice.

4. The method as defined in claim 1, wherein said step of removing includes:

extruding said metal as a hollow tube about a mandrel.

5. An apparatus for continuously forming electrically conductive metal including:
- a converging flux, concentric linear induction motor having a hollow, cylindrical stator member made of a material of a high magnetic permeability;
- said stator member including a plurality of annular teeth having teeth faces, said teeth being longitudinally spaced apart to define annular slots;
- a plurality of energizable coils positioned in said slots;
- a discrete facing on said teeth faces, said discrete facing being of a material having a higher magnetic permeability than said stator member, said discrete facing being of a thickness sufficient to prevent magnetic saturation of said discrete facing and said stator member; and
- means for forming said metal;
- whereby upon energization of said coils, said formed metal is moved axially from said forming means into said concentric motor by the generation of increased magnetic flux without magnetic saturation of the stator member or discrete facing.

6. The apparatus as defined in claim 5 wherein said formed metal coacts with the motor as an axially moving rotor member.

7. The apparatus as defined in claim 5 wherein said metal forming means includes an extrusion orifice and said metal is formed with a solid cross-section.

8. The apparatus as defined in claim 5 wherein said metal forming means includes a mandrel and said metal is formed as a hollow tube about said mandrel.

9. The apparatus as defined in claim 8 wherein said hollow tube has a circular cross-section.

10. The apparatus as defined in claim 8 wherein said motor further includes a rotor core radially interiorly of said stator and extending axially from said mandrel into said motor.

* * * * *